Patented Feb. 23, 1954

2,670,373

UNITED STATES PATENT OFFICE 2,670,373

HALOGENATED N-ARYL-N-DIALKYLAMINO-ALKYL-ARYLCARBOXAMIDES

John W. Cusic, Skokie, Ill., assignor to G. D. Searle & Co., Chicago, Ill., a corporation of Illinois No Drawing. Application August 29, 1950, Serial No. 182,132

8 Claims. (Cl. 260—558)

The present invention relates to a new type of organic amides, and more particularly to the halogenated N-aryl-N-dialkylaminoalkyl arylcarboxamides of the following structural formula

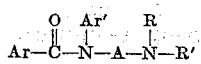

and salts thereof, wherein Ar and Ar' are halogenated aryl radicals, A is a bivalent, saturated, aliphatic hydrocarbon radical and R and R' are lower alkyl radicals.

The present application is a continuation-in-part of my copending application of Serial No. 162,605, filed May 17, 1950, now abandoned.

In the foregoing structural formula Ar and Ar' are halogenated aryl radicals, wherein the halogen is fluorine, chlorine, bromine or iodine and the aryl radical may be phenyl, tolyl, xylyl, anisyl, naphthyl and the like. The radical A represents a bivalent, saturated, aliphatic hydrocarbon radical. Such radicals are derived from straight and branched chain hydrocarbons and include radicals such as methylene, ethylene, propylene, butylene, amylene, hexylene, heptylene and polymethylene radicals such as trimethylene, tetramethylene, pentamethylene and hexamethylene. Among the radicals which R and R' may represent are such lower alkyl radicals as methyl, ethyl, propyl, butyl, amyl, hexyl, cyclopentyl and cyclohexyl, wherein the propyl, butyl, amyl and hexyl groups may be either of the straight chain or branched chain type. The radical NRR' may also be a part of a heterocyclic group such as N-piperidino, N-lupetidino, N-pyrrolidino, N-morpholino, N'-alkyl-N-piperazino and the like.

The organic bases of the foregoing type form salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The object of this invention is to provide new substances of the type indicated above. These new substances possess a number of highly useful therapeutic properties. These amides produce pronounced changes in blood circulation and especially peripheral vasodilation. They also produce a diuretic effect. When tested on isolated muscle preparations some of these compounds demonstrate spasmolytic action. Other compounds, especially some of the quaternary salts, have sympathicolytic and parasympathicolytic action and produce ganglion block. Others of these quaternary derivatives are useful as parasiticides.

The following examples illustrate in detail certain of the compounds which comprise this invention and methods for producing same. This invention is not to be construed as limited in spirit or in scope thereby. It will be apparent to chemists skilled in the art that many modifications in materials and methods may be made without departing from the invention. In each of these examples, temperatures are given in degrees centigrade (° C.), relative amounts of materials in parts by weight and pressures during vacuum distillations in millimeters (mm.) of mercury.

EXAMPLE 1

N-diethylaminoethyl-2-iodo-2'-chlorobenzanilide

A solution of 133 parts of 2-iodobenzoyl chloride is boiled with 113 parts of N-diethylaminoethyl-2-chloroaniline in 800 parts of butanone for 1 hour. A heavy precipitate forms within a few minutes. The reaction mixture is cooled, filtered and washed well with ether. The N-diethylaminoethyl-2-iodo-2'-chlorobenzanilide hydrochloride melts at about 221–222° C. It has the structural formula

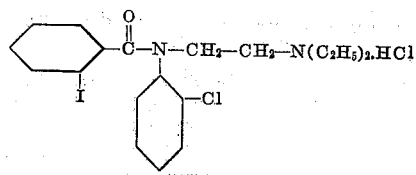

EXAMPLE 2

N-diethylaminoethyl-2-iodo-3'-chlorobenzanilide

A mixture of 133 parts of 2-iodobenzoyl chloride and 113 parts of N-diethylaminoethyl-3-chloroaniline in 800 parts of butanone is heated at refluxing temperature for 1 hour and permitted to stand over night. In order to induce precipitation, the cooled mixture is treated with ether and stored at 0° C. The precipitate is dissolved in water, made alkaline and extracted with ether. The ether extract is dried, filtered and evaporated. The residue is distilled at 1 mm. pressure at about 225–230° C.

A dry ether solution of the N-diethylaminoethyl-2-iodo-3'-chlorobenzanilide is treated with alcoholic hydrogen chloride. The hydrochloride crystallizes after prolonged standing. Recrystallization from butanone, with use of charcoal as a clarifying agent, yields white crystals melting at about 137–138° C.

In order to prepare the methobromide a mixture of 23 parts of the base, 15 parts of methyl bromide and 60 parts of butanone is maintained in a shielded pressure reactor for several hours at 0° C. The precipitated bromide is converted to the citrate by treatment of an isopropanol solution with ⅓ mole of silver citrate and 2 moles of anhydrous citric acid, filtration and evaporation of the filtrate in vacuo. The cation has the structural formula

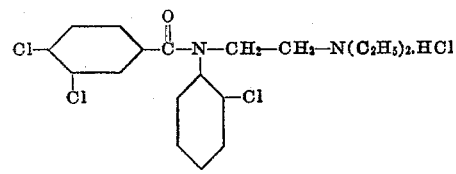

EXAMPLE 3

*N-diethylaminoethyl-2-iodo-4'-chlorobenzanilide*

A solution of 133 parts of 2-iodobenzoyl chloride and 113 parts of N-diethylaminoethyl-4-chloroaniline in 800 parts of butanone is boiled for 1 hour. A precipitate forms in a few minutes. The N-diethylaminoethyl-2-iodo-4'-chlorobenzanilide hydrochloride is cooled, filtered and washed well with ether. The melting point is at about 206–207° C.

EXAMPLE 4

*N-diethylaminoethyl-2-iodo-2',5'-dichlorobenzanilide*

266 parts of 2-iodobenzoyl chloride and 261 parts of N-diethylaminoethyl-2,5-dichloroaniline are heated at refluxing temperature for 3 hours in 1600 parts of butanone. After cooling, ether is added to the reaction mixture. After standing an oily precipitate forms. The mixture is concentrated on the steam bath and upon cooling a solid is obtained. Upon recrystallization from butanone the hydrochloride of N-diethylaminoethyl-2-iodo-2',5'-dichlorobenzaniline melts at about 142–143° C.

EXAMPLE 5

*N-diisopropylaminoethyl-2,4'-dibromobenzanilide*

A mixture of 195 parts of 4-bromoaniline and 23 parts of lithium amide is heated with stirring in 670 parts of dry xylene for 24 hours at about 120° C. In the course of 4 hours 164 parts of N-(β-chloroethyl) diisopropylamine are then added and heating at about 110° C., is continued for an additional 24 hours, efficient agitation being maintained throughout the reaction. The solvent is then removed in vacuo and the N-diisopropylaminoethyl-4-bromoaniline purified by vacuum distillaton. 299 parts of this product are heated at refluxing temperature with 234 parts of 2-bromophenylacetyl chloride in 2000 parts of butanone for 6 hours with mechanical stirring. The reaction mixture is extracted with dilute hydrochloric acid and the extract rendered alkaline by addition of dilute sodium hydroxide. The base is extracted with ether, the ether extract is dried over anhydrous potassium carbonate, stirred with charcoal, filtered and evaporated to yield the N-diisopropylaminoethyl-2,4'-dibromobenzanilide as a colorless oil. It has the structural formula

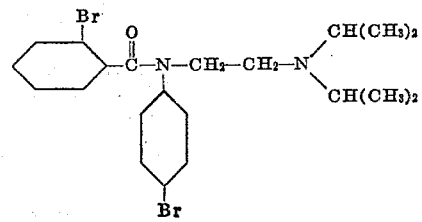

EXAMPLE 6

*N-diethylaminoethyl-3,4-dichloro-2'-chlorobenzanilide*

209 parts of 3,4-dichlorobenzoyl chloride and 226 parts of N-diethylaminoethyl-2-chloroaniline are dissolved in 1600 parts of butanone and heated at refluxing temperature for 1 hour. After standing and chilling a small amount of ethanol is added to react with any unused acid chloride and cooled to induce precipitation. The hydrochloride of N-diethylaminoethyl-3,4-dichloro-2'-chlorobenzanilide melts at about 171–172° C. It has the structural formula

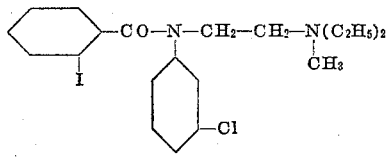

EXAMPLE 7

*N-diethylaminoethyl-3,4-dichloro-3'-chlorobenzanilide*

209 parts of 3,4-dichlorobenzoyl chloride and 226 parts of N-diethylaminoethyl-3-chloroaniline in 1600 parts of butanone are refluxed for 1 hour, chilled and treated with a small amount of ether to induce precipitation. The aqueous solution of the hydrochloride is converted to the base by treatment with sodium hydroxide solution. Extraction with ether and distillation at 215–220° C. and 1 mm. pressure yields the N-diethylaminoethyl-3,4-dichloro-3'-chlorobenzanilide.

EXAMPLE 8

*N-diethylaminoethyl-3,4-dichloro-4'-chlorobenzanilide*

A solution of 209 parts of 3,4-dichlorobenzoyl chloride and 226 parts of N-diethylaminoethyl-4-chloroaniline in 1600 parts of butanone is heated at refluxing temperature for 1 hour. Upon chilling the hydrochloride precipitates which melts at about 187–188° C.

EXAMPLE 9

*N-diethylaminoethyl-2,4-dichloro-2'-chlorobenzanilide*

A solution of 209 parts of 2,4-dichlorobenzoyl chloride and 226 parts of N-diethylaminoethyl-2-chloroaniline in 1600 parts of butanone is heated at refluxing temperature for 1 hour. The mixture is then concentrated to one half of the original volume, some ether is added and crystallization is induced by storing at 0° C. The N- diethylaminoethyl - 2,4-dichloro-2'-chlorobenzanilide is isolated by extracting the alkalinized product with ether and distilling at about 215–220° C. at 1 mm. pressure. The hydrochloride melts at about 124–127° C. upon crystallization from ethyl acetate.

EXAMPLE 10

*N-diethylaminoethyl - 2,4 - dichloro-4' - chlorobenzanilide*

A solution of 209 parts of 2,4-dichlorobenzoyl chloride and 226 parts of N-diethylaminoethyl-4-chloroaniline in 1600 parts of butanone is heated at refluxing temperature for 1 hour. The mixture is concentrated to one half volume, chilled and treated with ethanol. The precipitate is washed on the filter with butanone. The resulting N-diethylaminoethyl-2,4 - dichloro-4'-chlorobenzanilide hydrochloride melts at about 136–137° C.

EXAMPLE 11

*N- ( β,β - diethyl - γ - dimethylaminopropyl) - 8-iodo-2'-fluoro-naphthalenecarboxanilide*

A mixture of 220 parts of 2-fluoroaniline and 46 parts of lithium amide is heated with stirring in 1400 parts of dry xylene at about 120° C. for 24 hours. While the temperature is maintained at 100–110° C., there are added, with efficient stirring 400 parts of N,N-dimethyl-β,β-diethyl-γ-chloropropylamine (cf. C. Mannich and G. Baumgarten, Ber. Deut. Chem. Ges. 70, 210; 1937). Heating at 110° C. is continued for 24 hours, after which the solvent is removed and the N-(β,β - diethyl - γ - dimethylaminopropyl) - 2-fluoroaniline is purified by vacuum distillation. 282 parts of this aniline derivative are heated with 300 parts of 8-iodo-1-naphthoyl chloride in 3000 parts of butanone at refluxing temperature for 5 hours. The reaction mixture is then extracted with dilute hydrochloric acid and the extract rendered alkaline by addition of dilute sodium hydroxide. The base is extracted with ether, the ether extract is dried over anhydrous potassium hydroxide, stirred with charcoal, and filtered. Upon evaporation a clear, colorless residue is obtained of N-(β,β-diethyl-γ-dimethylaminopropyl) - 8 - iodo - 2'-fluoro - naphthalenecarboxanilide. It has the structural formula:

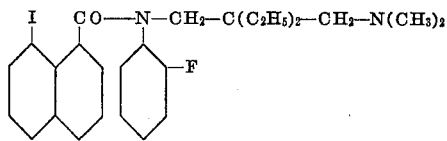

EXAMPLE 12

*N-(γ-dimethylaminopropyl) - N - (8 - chloro-2-methyl - 1 - naphthyl) -4-fluoro-3-nitrophenylcarboxamide*

A mixture of 190 parts of 8-chloro-2-methyl-1-naphthylamine (cf. V. Vesely et al., Collection Czechoslov. Chem. Communications, 7, 228; 1935) and 24 parts of lithium amide are stirred in 1200 parts of dry xylene at 120° C. for 24 hours. While the temperature is maintained at 100–110° C., 112 parts of γ-dimethylaminopropyl chloride are added with efficient stirring. Stirring at 110° C. is continued for 20 hours, after which the solvent is distilled off and the N-(γ-dimethylaminopropyl) - 8 - chloro-2-methylnaphthylamine submitted to vacuum distillation. 100 parts of this amine are heated with 74 parts of 4-fluoro-3-nitrobenzoyl chloride in 400 parts of butanone at refluxing temperature for 7 hours. The charge is extracted with dilute hydrochloric acid and the extract rendered alkaline by the addition of dilute potassium hydroxide. The base is then extracted with ether, the ether extract is dried over anhydrous calcium chloride, stirred with charcoal and filtered. Upon evaporation of the ether, the N-(γ - dimethylaminopropyl) - N - (8-chloro-2-methyl - 1 - naphthyl) -4-fluoro - 3 - nitrophenylcarboxamide is obtained as a colorless oil. It has the structural formula

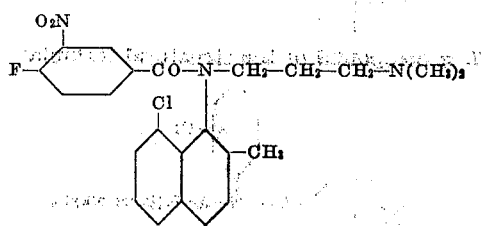

I claim:
1. A compound of the structural formula

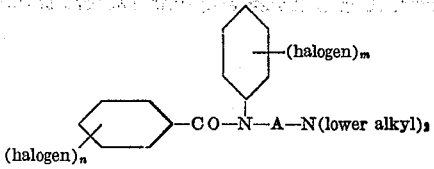

wherein A is a lower alkylene radical separating the two nitrogen atoms attached thereto by at least two carbon atoms and n and m are positive integers greater than zero and less than 3.

2. A compound of the structural formula

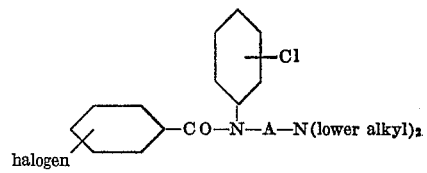

wherein A is a lower alkylene radical separating the two nitrogen atoms attached thereto by at least two carbon atoms.

3. A compound of the structural formula

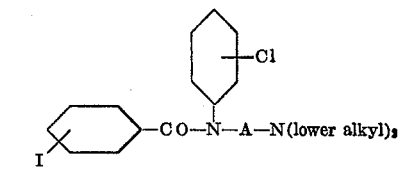

wherein A is a lower alkylene radical separating the two nitrogen atoms attached thereto by at least two carbon atoms.

4. A compound of the structural formula

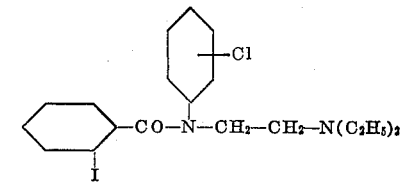

5. A compound of the structural formula

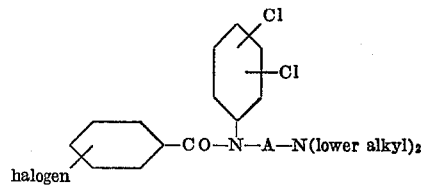

wherein A is a lower alkylene radical separating the two nitrogen atoms attached thereto by at least two carbon atoms.

6. A compound of the structural formula

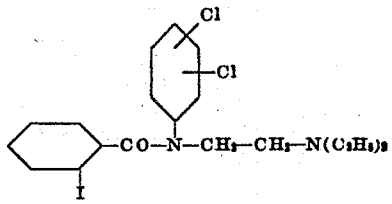

7. A compound of the structural formula

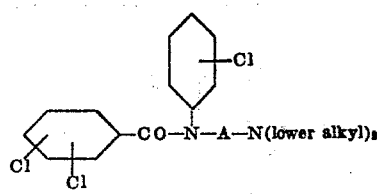

wherein A is a lower alkylene radical separating the two nitrogen atoms attached thereto by at least two carbon atoms.

8. A compound of the structural formula

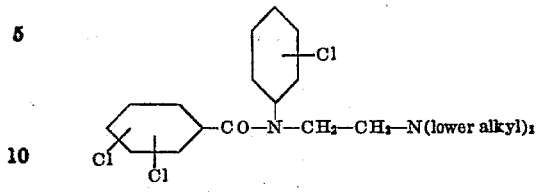

JOHN W. CUSIC.

References Cited in the file of this patent

FOREIGN PATENTS

| Number | Country | Date |
|---|---|---|
| 46,595 | Denmark | Dec. 5, 1932 |

OTHER REFERENCES

Viaud, "Produits Pharmaceutiques" 212 (1947), p. 56.